April 30, 1968     G. H. PETERSON     3,380,557
VARIABLE KINETIC ENERGY ABSORBER
Filed Oct. 6, 1966
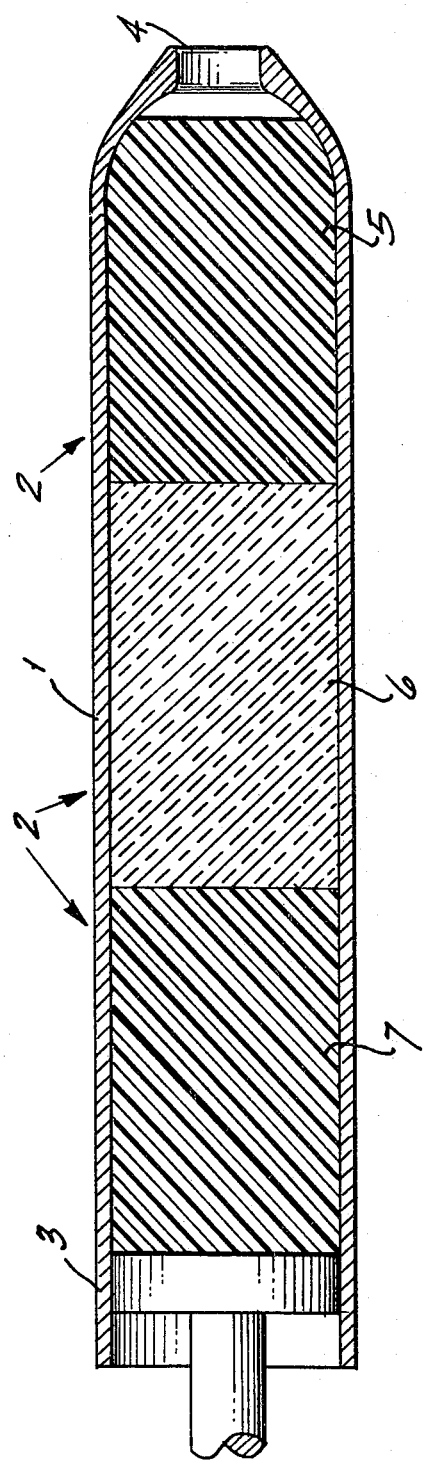
INVENTOR.
Gerald H. Peterson United States Patent Office 3,380,557
Patented Apr. 30, 1968

3,380,557
VARIABLE KINETIC ENERGY ABSORBER
Gerald H. Peterson, 1326 Armacost Ave.,
West Los Angeles, Calif. 90025
Filed Oct. 6, 1966, Ser. No. 584,718
5 Claims. (Cl. 188—1)

ABSTRACT OF THE DISCLOSURE

The invention relates to a kinetic energy dissipator having a cylinder, piston within said cylinder, and an extrusion orifice at the end of said cylinder opposite said piston, with different plastic materials within said cylinder between said piston and said orifice providing for different resistances to extrusion. A specific embodiment comprises three plastic materials with rubber at the front end near the orifice, lead in the middle portion of the cylinder, and aluminum particles at the back end near the piston. This arrangement of the kinetic energy dissipator has different resistances to extrusion with movement of the piston toward the extrusion orifice with the least resistance for the rubber, next in resistance for the lead, and the most resistance for the aluminum particles.

---

This invention relates to a kinetic energy absorber to be used between a moving object and an object with which said first object impacts having an arrangement for varying the resisting force with dipslacement of the moving piston of the absorber.

This invention is an improvement or modification of the subject matter disclosed in my Patent No. 2,997,325, which is incorporated herein by reference.

In the kinetic energy absorber of my patent, plastic material is enclosed within a cylinder having an orifice at one end and a piston at the other end for forward movement to extrude plastic material through the orifice to absorb kinetic energy.

In accordance with my present invention, different plastic materials are placed within the cylinder to give different resisting forces to extrusion at different positions of movement of the piston within the cylinder.

It is the primary object of this invention to provide a kinetic energy absorber of the type referred to having variations in resisting force to extrusion as the piston moves in the cylinder towards the orifice to force the plastic material through the orifice.

Other objects and advantages of my invention will be apparent to those skilled in the art from the description of a specific example of my invention below taken in conjunction with the accompanying drawing.

In the drawing, which serves to illustrate my invention but not necessarily to be taken as a limitation thereon:

The figure shows a cylinder 1 having plastic material therein, generally indicated by 2, a piston 3 and an extrusion orifice 4. In this particular embodiment there are three different plastic materials in the cylinder. In the front end at 5 the plastic material is rubber, preferably a relatively hard rubber, having relatively low elastic deformation for rubber. In the middle of the cylinder the plastic material shown at 6 is lead. Lead has a higher resistance to extrusion than the rubber, and after the rubber has been extruded, the extrusion of the lead will begin at a higher resisting force. At the back end of the cylinder the plastic material shown at 7 is aluminum particles, preferably closely and solidly packed. After the lead has been extruded, the aluminum will begin to extrude at a resisting force higher than that for lead. This arrangement of the kinetic energy absorber has different decelerations for different positions of extrusion.

It will be understood that in accordance with this invention two or more different plastic materials may be used to give any required variations in deceleration with position of travel of the piston. Moreover, any number of plastic materials may be used greater than two and in any desired order to give any desired variations in resistance to piston movement. For example, the aluminum may be the first to extrude, rubber next, and then the lead. This would give the highest resistance first and then the rubber the lowest with the resistance of the lead in between that of the aluminum and the rubber. A large number of different plastic materials could also be used to give a deceleration curve with time or displacement of any desired shape. Still further, each different plastic material used may be present in any different volume to give different forces of resistance corresponding to different positions of the piston during extrusion.

It will be understood that the specific embodiment in my invention described above is intended to illustrate and exemplify my invention and is not necessarily intended as a limitation thereon and modifications of my invention may be made within the scope of the following claims which define the invention sought to be covered by Letters Patent.

I claim:
1. The device for absorbing kinetic energy by controlled deformation of plastic material by extrusion which comprises a cylinder having plastic material therein and an extrusion orifice at one end of said cylinder, a piston at the other end of said cylinder adapted to move toward said orifice to force said plastic material to be extruded therethrough to absorb kinetic energy, said plastic material within said cylinder comprising axially arranged layers of at least two different plastic materials having different resistances to extrusion.

2. The device as defined in claim 1 in which said plastic materials having different resistances to extrusion are arranged so that the first to extrude has a lower such resistance than the following plastic material in the order of extrusion.

3. The device as defined in claim 1 in which the plastic materials are arranged in any order of resistance to extrusion to give any desired shape of deceleration with time of movement or displacement of said piston within said cylinder toward said orifice.

4. A device for absorbing kinetic energy by controlled deformation of plastic material by extrusion through an orifice, comprising: means defining a cylindrical space, in and filling said space a plurality of layers of plastic material having a low elasticity and high plasticity, said layers being disposed one against the other along the axis of said cylinder, each of said layers being composed of a such material having a resistance to extrusion that differs from the resistance to extrusion of an adjacent layer, an orifice at one end of said means and providing communication between said space and the exterior of said means, and means movable axially of said cylinder to reduce said space to cause said layers to be extruded through said orifice in continuous sequence, one to the next.

5. The combination of claim 4 in which said cylindrical space is elongated axially as compared with the diameter thereof.

References Cited

UNITED STATES PATENTS

| | | | |
|---|---|---|---|
| 2,029,789 | 2/1936 | Parks | 248—356 |
| 2,251,347 | 8/1941 | Williams et al. | 213—221 |
| 3,268,256 | 8/1966 | Blank | 293—60 |

ARTHUR L. LA POINT, *Primary Examiner.*

H. BELTRAN, *Assistant Examiner.*